US009243161B2

United States Patent
Taoka et al.

(10) Patent No.: US 9,243,161 B2
(45) Date of Patent: Jan. 26, 2016

(54) COMPOSITION CONTAINING VINYL ALCOHOL POLYMER

(71) Applicants: Yuta Taoka, Kurashiki (JP); Shinsuke Nii, Tainai (JP); Masato Nakamae, Kurashiki (JP)

(72) Inventors: Yuta Taoka, Kurashiki (JP); Shinsuke Nii, Tainai (JP); Masato Nakamae, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/346,451

(22) PCT Filed: Sep. 20, 2012

(86) PCT No.: PCT/JP2012/074101
§ 371 (c)(1),
(2) Date: Mar. 21, 2014

(87) PCT Pub. No.: WO2013/042744
PCT Pub. Date: Mar. 28, 2013

(65) Prior Publication Data
US 2014/0235778 A1  Aug. 21, 2014

(30) Foreign Application Priority Data
Sep. 22, 2011 (JP) .................. 2011-207897

(51) Int. Cl.
C09D 143/04    (2006.01)
C08F 216/06    (2006.01)
C08F 230/08    (2006.01)
C09D 129/04    (2006.01)
C09D 5/26      (2006.01)
D21H 17/36     (2006.01)
D21H 19/20     (2006.01)
D21H 19/60     (2006.01)
C09D 133/24    (2006.01)
C08K 5/54      (2006.01)
D21H 27/00     (2006.01)
B41M 5/44      (2006.01)
B41M 5/52      (2006.01)

(52) U.S. Cl.
CPC ............ *C09D 143/04* (2013.01); *C08F 216/06* (2013.01); *C08F 230/08* (2013.01); *C08K 5/54* (2013.01); *C09D 5/26* (2013.01); *C09D 129/04* (2013.01); *C09D 133/24* (2013.01); *D21H 17/36* (2013.01); *D21H 19/20* (2013.01); *D21H 19/60* (2013.01); *D21H 27/001* (2013.01); *B41M 5/443* (2013.01); *B41M 5/529* (2013.01); *B41M 2205/32* (2013.01)

(58) Field of Classification Search
CPC ...... C08F 16/06; C08F 210/06; C08F 230/08; C08L 19/04; C08K 3/10; C08K 3/34

USPC ................... 526/318; 525/342; 524/557, 413
See application file for complete search history.

(56) References Cited

U.S. PATENT DOCUMENTS

| | | | | |
|---|---|---|---|---|
| 4,567,221 A * | 1/1986 | Maruyama et al. | ........... | 524/436 |
| 4,617,239 A * | 10/1986 | Maruyama et al. | ........... | 428/452 |
| 5,460,645 A * | 10/1995 | Pandian et al. | .................. | 524/43 |
| 6,346,570 B1 * | 2/2002 | Kazuyuki et al. | ............. | 524/783 |
| 6,962,955 B2 * | 11/2005 | Kusudou | ................... | C08F 8/12 525/56 |
| 2005/0148736 A1 * | 7/2005 | Kato et al. | ................. | 525/330.3 |
| 2009/0227718 A1 | 9/2009 | Tanimoto et al. | | |
| 2014/0121099 A1 * | 5/2014 | Taoka et al. | ................... | 503/201 |
| 2014/0235778 A1 * | 8/2014 | Taoka et al. | ................... | 524/398 |

FOREIGN PATENT DOCUMENTS

| | | | |
|---|---|---|---|
| EP | 0076490 A1 | 4/1983 | |
| EP | 0123927 A2 | 11/1984 | |
| EP | 1380600 A1 | 1/2004 | |
| JP | 58 59203 | 4/1983 | |

(Continued)

OTHER PUBLICATIONS

International Search Report Issued Dec. 25, 2012 in PCT/JP12/074101 Filed Sep. 20, 2012.
Extended European Search Report (ESSR) dated May 8, 2015, in European Patent Application No. 12834054.4.

*Primary Examiner* — Rip A Lee
(74) *Attorney, Agent, or Firm* — Oblon, McClelland, Maier & Neustadt, L.L.P.

(57) ABSTRACT

Provided is a composition comprising: a vinyl alcohol polymer (A) comprising a monomer unit having a group represented by a formula (1); and a compound (B) comprising a silicon atom, a titanium atom, a zirconium atom or a combination thereof,
at a content of 0.01 parts by mass or greater and 900 parts by mass or less with respect to 100 parts by mass of the vinyl alcohol polymer (A),

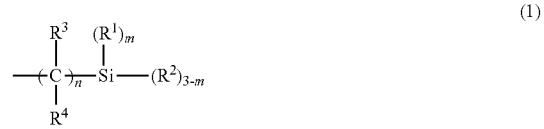

(1)

wherein an inequality (I) is satisfied:

$$370 \leq P \times S \leq 6{,}000 \qquad (I)$$

wherein, P represents a viscosity average degree of polymerization; and S represents a percentage content (mol %) of the monomer unit. Also provided are a coating agent containing the composition, and a coated article, a thermal recording material, an ink jet recording material and a base paper for a release paper that are produced using the coating agent, and a method for producing a coated article.

15 Claims, No Drawings

(56) References Cited

FOREIGN PATENT DOCUMENTS

| JP | 58 214596 | 12/1983 |
| JP | 59 179605 | 10/1984 |
| JP | 59 179683 | 10/1984 |
| JP | 2001-138637 A | 5/2001 |
| JP | 2004 043644 | 2/2004 |
| JP | 2005 194437 | 7/2005 |
| JP | 2005 194672 | 7/2005 |
| JP | 2005 220348 | 8/2005 |
| WO | 2005 121241 | 12/2005 |

* cited by examiner

COMPOSITION CONTAINING VINYL ALCOHOL POLYMER

TECHNICAL FIELD

The present invention relates to a composition containing a vinyl alcohol polymer, a coating agent containing the composition, and a coated article, a thermal recording material, an ink jet recording material and a base paper for a release paper that are produced using the coating agent, as well as a method for producing a coated article.

BACKGROUND ART

Vinyl alcohol polymers (hereinafter, may be abbreviated as "PVAs") typified by polyvinyl alcohol are known as water-soluble synthetic macromolecules, and are widely used in intended usages including raw materials for vinylon, which is a synthetic fiber, paper coating agents, fiber coating agents, adhesives, stabilizers for emulsion polymerization and suspension polymerization, binders for inorganic substances, and films. In particular, PVA is superior in strength characteristics and film-forming property as compared with other water-soluble synthetic macromolecules. Accordingly, based on these properties, compositions containing the PVA are successfully utilized as coating agents for improving surface properties of substrates such as papers (clear coating agents, binders in pigment coating, and the like), and the like.

In order to further enhance such characteristics of the PVA, various types of modified PVAs have been developed. As one example of the modified PVAs, silyl group-containing PVA is exemplified. The silyl group-containing PVA has superior water resistance and binder force to inorganic substances. However, the silyl group-containing PVA is accompanied by the following disadvantages that: (a) in the preparation of aqueous solutions thereof, the silyl group-containing PVA is less likely to be sufficiently dissolved unless an alkali such as sodium hydroxide or an acid is added; (b) viscosity stability of the prepared aqueous solutions tends to readily deteriorate; (c) in the formation of a coating film containing an inorganic substance, it is difficult to obtain a coating film having the water resistance and the binder force to the inorganic substance both being satisfactory; and the like.

In light of the foregoing, there have been proposed a silyl group-containing PVA having an improved solubility in water and the like by adjusting a product (P×S) of a viscosity average degree of polymerization (P) and a percentage content (S: mol %) of monomer units having a silyl group to fall within a predetermined range, and the like (see Japanese Unexamined Patent Application, Publication No. 2004-43644), and a coating agent containing the silyl group-containing PVA (see Japanese Unexamined Patent Application, Publication No. 2005-194437). However, in the silyl group-containing PVA, the upper limit of the product (P×S) has been proposed to be 370, and a trade-off relationship between enhancing the characteristics as the silyl group-containing PVA through an increase of the percentage content of the monomer units having a silyl group and enhancing a solubility in water and the like thereof has not been overcome. More specifically, the silyl group-containing PVA has a disadvantage in handling that in a case where the product (P×S) is 370 or greater, in preparing an aqueous solution of the silyl group-containing PVA, it is occasionally impossible to dissolve the silyl group-containing PVA unless an alkali or an acid is added, as disclosed in paragraph 0009 of Japanese Unexamined Patent Application, Publication No. 2004-43644 cited above. Accordingly, the silyl group-containing PVA also has not sufficiently solved the aforementioned disadvantages.

Furthermore, more superior water resistance (including boiling water resistance) or blocking resistance may be required for coating films produced from a PVA-containing composition, depending on various types of modes of use and the like. Accordingly, development of compositions capable of providing a coating film that meets these characteristics has been desired.

PRIOR ART DOCUMENTS

Patent Documents

Patent Document 1: Japanese Unexamined Patent Application, Publication No. 2004-43644
Patent Document 2: Japanese Unexamined Patent Application, Publication No. 2005-194437

SUMMARY OF THE INVENTION

Problems to be Solved by the Invention

The present invention was made in view of the foregoing circumstances, and an object of the present invention is to provide a composition having superior handleability and being capable of providing a highly water resistant and blocking resistant coating film, a coating agent containing the composition, and a coated article, a thermal recording material (may be also referred to as "thermal recording material"), an ink jet recording material and a base paper for a release paper that are produced using the coating agent, as well as a method for producing a coated article.

Means for Solving the Problems

According to an aspect of the present invention made for solving the aforementioned problems, a composition comprises:

(A) PVA that comprises a monomer unit having a group represented by the following formula (1); and (B) a compound that comprises a silicon atom, a titanium atom, a zirconium atom or a combination thereof, at a content of 0.01 parts by mass or greater and 900 parts by mass or less with respect to 100 parts by mass of PVA (A),

[Chemical Formula 1]

(1)

wherein, in the formula (1), $R^1$ represents a hydrogen atom or an alkyl group having 1 to 5 carbon atoms; $R^2$ represents an alkoxyl group, an acyloxyl group or a group represented by OM, wherein M represents a hydrogen atom, an alkali metal or an ammonium group; $R^3$ and $R^4$ each independently represent a hydrogen atom or an alkyl group, wherein hydrogen atoms included in the alkyl group, the alkoxyl group and the acyloxyl group represented by $R^1$ to $R^4$ are unsubstituted or substituted with a substituent having an oxygen atom or a nitrogen atom; m is an integer of 0 to 2; n is an integer of 3 or greater, wherein in a case in which $R^1$ to $R^4$ are each present in a plurality of number, a plurality of $R^1$ s are each independently as defined above, a plurality of $R^2$s are each independently as defined above, a plurality of $R^3$s are each independently as defined above, and a plurality of $R^4$s are each independently as defined above, and wherein the following inequality (I) is satisfied:

$$370 \leq P \times S \leq 6,000 \qquad (I)$$

wherein, P represents a viscosity average degree of polymerization; and S represents a percentage content (mol %) of the monomer unit.

PVA (A) comprised in the composition includes the monomer unit having a group represented by the above formula (1), and more specifically a structure in which a silyl group is bound to the main chain via an alkylene group having 3 or more carbon atoms. Accordingly, the composition exhibits superior handleability even when the degree of modification with the silyl group in PVA (A) comprised is increased, since solubility in water of PVA (A) in a neutral pH region is high. In addition, according to the composition, since the product (P×S) of the viscosity average degree of polymerization (P) and the percentage content (S) of the monomer unit of PVA (A) comprised falls within the above range, the degree of modification with the silyl group can be increased, and therefore a highly water resistant and blocking resistant coating film can be obtained. Furthermore, according to the composition, since the compound (B) functions as a preferable crosslinking agent for PVA (A), the water resistance and the blocking resistance of the resultant coating film can be improved.

The compound (B) is preferably a silane coupling agent, a hydrolytically condensed oligomer of a silane coupling agent, colloidal silica, an organic titanium compound, a zirconium complex salt or a combination thereof. When the aforementioned compound is used as the compound (B), the aforementioned various performances of the composition can be exhibited more preferably.

It is preferred that the following inequalities (II) and (III) are further satisfied according to PVA (A):

$$200 \leq P \leq 4,000 \qquad (II)$$

$$0.1 \leq S \leq 10 \qquad (III)$$

wherein, P represents a viscosity average degree of polymerization; and S represents a percentage content (mol %) of the monomer unit.

When the viscosity average degree of polymerization (P) of PVA (A) and the percentage content (S) of the monomer unit thus fall within the above range, the solubility in water and the like of PVA (A) can be improved, and the water resistance and the blocking resistance of the resultant coating film and the like can be further improved.

n in the above formula (1) is preferably an integer of 6 or greater and 20 or less. When n falls within the above range, a reactivity of the silyl group with a crosslinking agent used in combination with the vinyl alcohol polymer can be increased, whereby the water resistance and the blocking resistance of the resultant coating film can be further improved.

The monomer unit is preferably represented by the following formula (2).

[Chemical Formula 2]

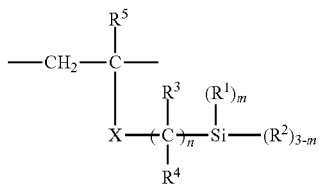

In the formula (2), $R^1$ represents a hydrogen atom or an alkyl group having 1 to 5 carbon atoms; $R^2$ represents an alkoxyl group, an acyloxyl group or a group represented by OM, wherein M represents a hydrogen atom, an alkali metal or an ammonium group; $R^3$ and $R^4$ each independently represent a hydrogen atom or an alkyl group, wherein hydrogen atoms included in the alkyl group, the alkoxyl group and the acyloxyl group represented by $R^1$ to $R^4$ are unsubstituted or substituted with a substituent having an oxygen atom or a nitrogen atom; m is an integer of 0 to 2; and n is an integer of 3 or greater; wherein in a case in which $R^1$ to $R^4$ are each present in a plurality of number, a plurality of $R^1$s are each independently as defined above, a plurality of $R^2$s are each independently as defined above, a plurality of $R^3$s are each independently as defined above, and a plurality of $R^4$s are each independently as defined above. X represents a direct bond, a divalent hydrocarbon group or a divalent organic group having an oxygen atom or a nitrogen atom. $R^5$ represents a hydrogen atom or a methyl group.

When the monomer unit has the structure represented by the above formula (2), various performances of the composition can be more improved.

X in the above formula (2) preferably represents —CO—NR$^6$—*, wherein $R^6$ represents a hydrogen atom or an alkyl group having 1 to 5 carbon atoms, and * denotes a binding site to a group represented by the above formula (1). When the monomer unit thus has an amide structure at a position away from the silyl group, the solubility in water and the like of PVA (A) can be more improved, while maintaining the performances resulting from the silyl group of PVA (A).

It is preferred that X in the above formula (2) is represented by —CO—NH—*, wherein * denotes a binding site to a group represented by the above formula (1), and n is an integer of 12 or less. When the monomer unit has such a structure, the solubility in water and the like of PVA (A) are improved, various characteristics of a coating film produced from the composition can be improved, and additionally, PVA (A) can be easily produced.

It is preferred that the composition further comprises (C) a polyamide polyamine epichlorohydrin-based resin. When the composition thus comprises the polyamide polyamine epichlorohydrin-based resin (C) in addition to the compound (B), a coating film produced from the composition is less likely to be peeled from a substrate, whereby a coated article having superior water resistance can be obtained.

PVA (A) that comprises the monomer unit having the group represented by the above formula (2) is preferably produced by saponifying a copolymer of an unsaturated monomer represented by the following formula (3) with a vinyl ester monomer. When PVA (A) obtained by such a method is used, various characteristics of the composition can be exerted more preferably.

[Chemical Formula 3]

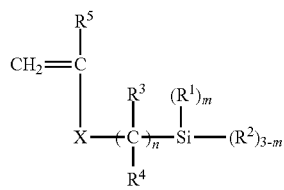

(3)

In the formula (3), $R^1$ represents a hydrogen atom or an alkyl group having 1 to 5 carbon atoms; $R^2$ represents an alkoxyl group, an acyloxyl group or a group represented by OM, wherein M represents a hydrogen atom, an alkali metal or an ammonium group; $R^3$ and $R^4$ each independently represent a hydrogen atom or an alkyl group; $R^5$ represents a hydrogen atom or a methyl group; wherein hydrogen atoms included in the alkyl group, the alkoxyl group and the acyloxyl group represented by $R^1$ to $R^4$ are unsubstituted or substituted with a substituent having an oxygen atom or a nitrogen atom; X represents a direct bond, a divalent hydrocarbon group or a divalent organic group having an oxygen atom or a nitrogen atom; m is an integer of 0 to 2; and n is an integer of 3 or greater; wherein in a case in which $R^1$ to $R^4$ are each present in a plurality of number, a plurality of $R^1$s are each independently as defined above, a plurality of $R^2$s are each independently as defined above, a plurality of $R^3$s are each independently as defined above, and a plurality of $R^4$s are each independently as defined above.

The coating agent according to another aspect of the present invention comprises the composition. When the coating agent is used, a coating film and a coated article exhibiting superior water resistance, blocking resistance and the like can be obtained.

The coated article according to still another aspect of the present invention is produced by applying the coating agent on the surface of a substrate. The coated article has a coating film exhibiting superior water resistance and the like, since the coating agent is applied on the surface of the substrate. In addition, a method for producing a coated article according to yet another aspect of the present invention comprises applying the coating agent on the surface of a substrate. The method for production enables the coated article to be easily provided.

The thermal recording material according to still yet another aspect of the present invention is the coated article according to the aspect of the present invention. The ink jet recording material according to still yet another aspect of the present invention is the coated article according to the aspect of the present invention. In addition, the base paper for a release paper according to still yet another aspect of the present invention is the coated article according to the aspect of the present invention. The thermal recording material, the ink jet recording material and the base paper for a release paper is a coated article that exhibits superior water resistance and the like, whereby the thermal recording material, the ink jet recording material and the base paper for a release paper have superior water resistance, blocking resistance, and the like.

Effects of the Invention

As explained in the foregoing, the composition according to the aspect of the present invention exhibits superior handleability, and can provide a highly water resistant and blocking resistant coating film. Therefore, a coated article produced by applying a coating agent comprising the composition has superior water resistance and blocking resistance, and accordingly can be preferably used as a thermal recording material, an ink jet recording material, a base paper for a release paper, and the like.

DESCRIPTION OF EMBODIMENTS

Hereinafter, the composition, the coating agent, the coated article and the method for producing the same, the thermal recording material, the ink jet recording material, as well as the base paper for a release paper according to embodiments of the present invention will be explained in more detail.

Composition

The composition according to an embodiment of the present invention comprises (A) PVA that comprises a specific monomer unit, and (B) a compound, which will be described below in more detail. In addition, the composition preferably further comprises (C) a polyamide polyamine epichlorohydrin-based resin, and may additionally comprise other components. In the following, each component is explained below in order.

PVA (A)

PVA (A) comprises a monomer unit having a group represented by the above formula (1). More specifically, PVA (A) is a copolymer comprising a monomer unit having a group represented by the above formula (1) and a vinyl alcohol unit (—CH$_2$—CHOH—), and may further comprise other monomer unit(s).

In the above formula (1), $R^1$ represents a hydrogen atom or an alkyl group having 1 to 5 carbon atoms. Examples of the alkyl group include a methyl group, an ethyl group, a propyl group, and the like.

$R^2$ represents an alkoxyl group, an acyloxyl group or a group represented by OM. M represents a hydrogen atom, an alkali metal or an ammonium group ($^+$NH$_4$). Examples of the alkoxyl group include a methoxy group, an ethoxy group, and the like. Examples of the acyloxyl group include an acetoxy group, a propionyloxy group, and the like. Examples of the alkali metal include sodium, potassium, and the like. Among these groups which may be represented by $R^2$, an alkoxyl group and a group represented by OM are preferred; an alkoxyl group having 1 to 5 carbon atoms and a group represented by OM in which M represents a hydrogen atom or an alkali metal are more preferred; and a methoxy group, an ethoxy group and a group represented by OM in which M represents sodium or potassium are still more preferred.

$R^3$ and $R^4$ each independently represent a hydrogen atom or an alkyl group. The alkyl group is exemplified by the aforementioned alkyl group having 1 to 5 carbon atoms. $R^3$ and $R^4$ are preferably a hydrogen atom or a methyl group.

Hydrogen atoms included in the alkyl group, the alkoxyl group and the acyloxyl group represented by $R^1$ to $R^4$ are unsubstituted or substituted with a substituent having an oxygen atom or a nitrogen atom. Examples of the substituent having an oxygen atom include an alkoxyl group, an acyloxyl group, and the like. In addition, examples of the substituent having a nitrogen atom include an amino group, a cyano group, and the like.

It is to be noted that in a case where $R^1$ to $R^4$ are each present in a plurality of number, a plurality of $R^1$s are each independently as defined above, a plurality of $R^2$s are each independently as defined above, a plurality of $R^3$s are each independently as defined above, and a plurality of $R^4$s are each independently as defined above.

m is an integer of 0 to 2, and preferably 0. When m is 0, in other words, the monomer unit has three $R^2$ groups, the effects exerted by the modification can be more enhanced.

n is an integer of 3 or greater. Although the upper limit of n is not particularly limited, the upper limit of n is 20 for example, and preferably 12. When n in the above formula (1) is 3 or greater, and more specifically PVA (A) comprises a structure in which a silyl group is bound to the main chain via an alkylene group having 3 or more carbon atoms, deterioration of solubility in water and viscosity stability of PVA (A) can be inhibited even when the degree of modification with the silyl group is increased. Although the reasons for the exertion of such effects are not fully elucidated, it is presumed, for example, that the alkylene group having 3 or more carbon atoms that exhibits hydrophobicity reduces the rate of hydrolysis of Si—$R^2$ in an aqueous solution, whereby the reaction is inhibited.

Furthermore, n is more preferably an integer of 6 or greater. When n falls within such a range, a reactivity of the silyl group with a crosslinking agent typically used in combination with the vinyl alcohol polymer can be increased, and the water resistance and the blocking resistance of the resultant coating film can be further improved.

A specific structure of the monomer unit is not particularly limited as long as the monomer unit has the group represented by the above formula (1); however, the specific structure of the monomer unit is preferably represented by the above formula (2).

In the formula (2), $R^1$ to $R^4$, m and n are as defined in the above formula (1). In addition, preferred groups or numerical ranges thereof are identical to those in the above formula (1).

X represents a direct bond, a divalent hydrocarbon group or a divalent organic group having an oxygen atom or a nitrogen atom. When the monomer unit has the structure represented by the above formula (2), various performances such as the solubility in water and the viscosity stability of PVA (A) as well as the water resistance and the binder performances of the resultant coating film can be more improved.

Examples of the divalent hydrocarbon group include a divalent aliphatic hydrocarbon group having 1 to 10 carbon atoms, a divalent aromatic hydrocarbon group having 6 to 10 carbon atoms, and the like. Examples of the aliphatic hydrocarbon group having 1 to 10 carbon atoms include a methylene group, an ethylene group, a propylene group, and the like. Examples of the divalent aromatic hydrocarbon group having 6 to 10 carbon atoms include a phenylene group, and the like. Examples of the divalent organic group having an oxygen atom include an ether group, an ester group, a carbonyl group, an amide group, a group derived by linking these groups with a divalent hydrocarbon group, and the like. Examples of the divalent organic group having a nitrogen atom include an imino group, an amide group, a group derived by linking these groups with a divalent hydrocarbon group, and the like.

Among the groups represented by X, a divalent organic group having an oxygen atom or a nitrogen atom is preferred, a group having an amide group is more preferred, and a group represented by —CO—$NR^6$—*, wherein $R^6$ represents a hydrogen atom or an alkyl group having 1 to 5 carbon atoms; and * denotes a binding site to the group represented by the above formula (1) is still more preferred. When the monomer unit thus has a polar structure, preferably an amide structure, at a position away from the silyl group, the solubility in water, the viscosity stability and the like can be more improved while maintaining the performances resulting from the silyl group. It is to be noted that $R^6$ preferably represents a hydrogen atom in light of more improving the aforementioned functions, and allowing PVA (A) to be easily produced.

$R^5$ represents a hydrogen atom or a methyl group.

The monomer unit is still more preferably represented by the following formula (4).

[Chemical Formula 4]

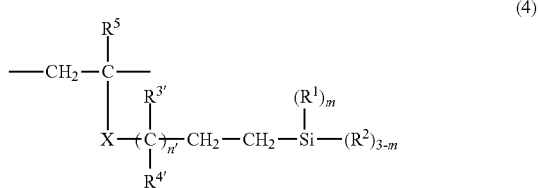

In the above formula (4), $R^1$, $R^2$, $R^5$, X and m are as defined in the above formula (2). In addition, preferred groups or numerical ranges thereof are also identical to those in the above formula (2).

In the above formula (4), $R^{3'}$ and $R^{4'}$ each independently represent a hydrogen atom or an alkyl group. The alkyl group is exemplified by the aforementioned alkyl group having 1 to 5 carbon atoms. $R^{3'}$ and $R^{4'}$ preferably represent a hydrogen atom or a methyl group, and more preferably a hydrogen atom. Hydrogen atoms included in the alkyl group represented by $R^{3'}$ and $R^{4'}$ are unsubstituted or substituted with a substituent having an oxygen atom or a nitrogen atom. Examples of the substituent having an oxygen atom include an alkoxyl group, an acyloxyl group, and the like. In addition, examples of the substituent having a nitrogen atom include an amino group, a cyano group, and the like. It is to be noted that in a case where $R^{3'}$ and $R^{4'}$ are each present in a plurality of number, a plurality of $R^{3'}$'s and $R^{4'}$'s are each independently as defined above.

In the above formula (4), n' is an integer of 1 or greater. Although the upper limit of n' is not particularly limited, the upper limit of n' is 18 for example, and preferably 10. Furthermore, n' is more preferably an integer of 4 or greater. When n' falls within such a range, a reactivity of the silyl group with a crosslinking agent typically used in combination with the vinyl alcohol polymer can be increased, and the water resistance and the blocking resistance of the resultant coating film can be further improved.

When the monomer unit is represented by the above formula (4), various functions of the composition can be exhibited more effectively. Although the reasons for this effect are also unclear, it is presumed that the aforementioned functions of reducing the rate of hydrolysis of Si—$R^2$ in the aqueous solution and inhibiting the reaction are exerted more effectively.

According to PVA (A), the following inequality (I) is satisfied:

$$370 \leq P \times S \leq 6{,}000 \qquad (I)$$

wherein, P represents a viscosity average degree of polymerization; and S represents a percentage content (mol %) of the monomer unit.

The viscosity average degree of polymerization (P) is determined in accordance with JIS-K6726. More specifically, in the case of PVA (A) having a degree of saponification of less than 99.5 mol %, PVA (A) is resaponified such that the degree of saponification thereof is 99.5 mol % or greater, and purified. Thereafter, the viscosity average degree of polymerization (P) can be determined according to the following formula based on a limiting viscosity [η] (unit: deciliter/g) as determined in water at 30° C.

$$P=([\eta]\times 1000/8.29)^{(1/0.62)}$$

The percentage content (S: mol %) of the monomer unit is determined based on proton NMR of the vinyl ester polymer before the saponification. In measuring proton NMR of the vinyl ester polymer before the saponification, the vinyl ester polymer is purified by reprecipitation with hexane-acetone to sufficiently remove the unreacted monomer having a silyl group from the polymer, dried under a reduced pressure at 90° C. for 2 days, then dissolved in a CDCl$_3$ solvent, and thereafter analyzed.

The product (P×S) of the viscosity average degree of polymerization (P) and the percentage content (S) of the monomer unit corresponds to the number (average) of the monomer units with respect to 100 molecules. When the product (P×S) is less than the lower limit, various characteristics imparted by the silyl group such as the water resistance and the binder performances of the coating film produced from the composition cannot be sufficiently exhibited. To the contrary, when the product (P×S) exceeds the upper limit, the solubility in water and the viscosity stability of the PVA may be deteriorated. The product (P×S) preferably satisfies the following inequality (I'), and more preferably the following inequality (I").

$$400 \leq P \times S \leq 3{,}000 \tag{I'}$$

$$500 \leq P \times S \leq 2{,}000 \tag{I''}$$

It is preferred that the following inequalities (II) and (III) are further satisfied according to PVA (A):

$$200 \leq P \leq 4{,}000 \tag{II}$$

$$0.1 \leq S \leq 10 \tag{III}$$

wherein, P represents a viscosity average degree of polymerization; and S represents a percentage content (mol %) of the monomer unit.

When the viscosity average degree of polymerization (P) and the percentage content (S) of the monomer unit each thus fall within the above range, the solubility in water and the viscosity stability of the PVA, as well as the water resistance, the blocking resistance and the like of the resultant coating film can be increased.

Furthermore, the viscosity average degree of polymerization (P) more preferably satisfies the following inequality (II'), and still more preferably the following inequality (II").

$$500 \leq P \leq 3{,}000 \tag{II'}$$

$$1{,}000 \leq P \leq 2{,}400 \tag{II''}$$

When the viscosity average degree of polymerization (P) is less than the lower limit, the water resistance and the blocking resistance and the like of the resultant coating film may be deteriorated. To the contrary, when the viscosity average degree of polymerization (P) exceeds the upper limit, the solubility in water, the viscosity stability and the like may be deteriorated.

In addition, the percentage content (S) of the monomer unit more preferably satisfies the following inequality (III'), and still more preferably the following inequality (III").

$$0.25 \leq S \leq 6 \tag{III'}$$

$$0.5 \leq S \leq 5 \tag{III''}$$

When the percentage content (S) of the monomer unit is less than the lower limit, the water resistance, the blocking resistance and the like of the resultant coating film may be deteriorated. To the contrary, when the percentage content (S) of the monomer unit exceeds the upper limit, the solubility in water, the viscosity stability, and the like may be deteriorated.

Although the degree of saponification of PVA (A) is not particularly limited, the degree of saponification thereof is preferably 80 mol % or greater, more preferably 90 mol or greater, still more preferably 95 mol % or greater, and particularly preferably 97 mol % or greater. When the degree of saponification of PVA (A) is less than the lower limit, the water resistance and the like of the resultant coating film may be deteriorated. It is to be noted that, although the upper limit of the degree of saponification of PVA (A) is not particularly limited, the upper limit is, for example, 99.9 mol % in light of productivity of PVA (A) and the like. The degree of saponification of PVA (A) as referred to herein means a value determined in accordance with the method specified in JIS-K6726.

Method for Producing PVA (A)

Although the method for producing PVA (A) is not particularly limited, for example, PVA (A) can be produced by copolymerizing a vinyl ester monomer with a monomer having a group represented by the above formula (1), and saponifying the resultant copolymer (vinyl ester polymer).

The vinyl ester monomer is exemplified by vinyl formate, vinyl acetate, vinyl propionate, vinyl valerate, vinyl caprate, vinyl laurate, vinyl stearate, vinyl benzoate, vinyl pivalate, vinyl versatate, and the like, and among these, vinyl acetate is preferred.

In addition, upon the copolymerization of the monomer having the group represented by the above formula (1) with the vinyl ester monomer, for the purpose of regulating the viscosity average degree of polymerization (P) of the resultant PVA (A), and the like, the polymerization may be carried out in the presence of a chain transfer agent within a range not leading to impairment of the gist of the present invention. Examples of the chain transfer agent include: aldehydes such as acetaldehyde and propionaldehyde; ketones such as acetone and methyl ethyl ketone; mercaptans such as 3-mercaptopropyltrimethoxysilane, 3-mercaptopropyltriethoxysilane, 2-hydroxyethanethiol, n-dodecanethiol, mercaptoacetic acid and 3-mercaptopropionic acid; halogens such as tetrachloromethane, bromotrichloromethane, trichloroethylene and perchloroethylene; and the like.

The monomer having the group represented by the above formula (1) is exemplified by a compound represented by the above formula (3). When the compound represented by the above formula (3) is used, PVA (A) comprising the monomer unit having the group represented by the above formula (2) can be eventually obtained easily.

In the above formula (3), $R^1$ to $R^5$, X, m and n are as defined in the above formula (2). In addition, preferred groups or numerical ranges thereof are identical to those in the above formula (2).

Examples of the compound represented by the above formula (3) include 3-(meth)acrylamidopropyltrimethoxysilane, 4-(meth)acrylamidobutyltrimethoxysilane, 6-(meth)acrylamidohexyltrimethoxysilane, 8-(meth)acrylamidododecyltrimethoxysilane, 12-(meth)acrylamidododecyltrimethoxysilane, 18-(meth)acrylamidooctadecyltrimethoxysilane, 3-(meth)acrylamidopropyltriethoxysilane, 3-(meth)acrylamidopropyltributoxysilane, 3-(meth)acrylamidopropylmethyldimethoxysilane, 3-(meth)acrylamidopropyldimethylmethoxysilane, 3-(meth)acrylamido-3-methylbutyltrimethoxysilane, 4-(meth)

acrylamido-4-methylbutyltrimethoxysilane, 4-(meth)acrylamido-3-methylbutyltrimethoxysilane, 5-(meth)acrylamido-5-methylhexyltrimethoxysilane, 4-pentenyltrimethoxysilane, 5-hexenyltrimethoxysilane, and the like.

The method for copolymerizing the vinyl ester monomer with the monomer having the group represented by the above formula (1) is exemplified by a well-known process such as a bulk polymerization process, a solution polymerization process, a suspension polymerization process and an emulsion polymerization process. In particular, when a polymerization temperature below 30° C. is desired, the emulsion polymerization process is preferred, whereas when a polymerization temperature of 30° C. or greater is desired, the bulk polymerization process in which the polymerization is carried out in the absence of a solvent or the solution polymerization process in which the polymerization is carried out using a solvent such as an alcohol is typically employed.

In the case of the emulsion polymerization process, the solvent is exemplified by water, and a lower alcohol such as methanol or ethanol may be used in combination with water. In addition, well-known emulsifying agents can be used as the emulsifying agent. As an initiator in the copolymerization, a redox type initiator provided by a combination of an iron ion, an oxidizing agent and a reducing agent is preferably used for the purpose of controlling the polymerization. In the case of the bulk polymerization process and the solution polymerization process, the copolymerization reaction can be carried out in either a batchwise system or a continuous system. When the solution polymerization process is employed for carrying out the copolymerization reaction, the alcohol used as the solvent is exemplified by a lower alcohol such as methanol, ethanol and propanol. The initiator used in this copolymerization reaction is exemplified by well-known initiators which may include azo initiators such as 2,2'-azobisisobutyronitrile, 2,2'-azobis(2,4-dimethylvaleronitrile), 1,1'-azobis(cyclohexane-1-carbonitrile) and 2,2'-azobis(N-butyl-2-methylpropionamide); peroxide initiators such as benzoyl peroxide and n-propyl peroxycarbonate. Although the temperature at which the copolymerization is carried out is not particularly limited, a range of 5° C. to 50° C. is suitable.

In the copolymerization reaction, a copolymerizable monomer can be copolymerized, as needed, within a range not leading to impairment of the gist of the present invention. Examples of the monomer include: α-olefins such as ethylene, propylene, 1-butene, isobutene and 1-hexene; carboxylic acids or derivatives thereof such as fumaric acid, maleic acid, itaconic acid, maleic anhydride and itaconic anhydride; acrylic acid or salts thereof, and acrylic acid esters such as methyl acrylate, ethyl acrylate, n-propyl acrylate and isopropyl acrylate; methacrylic acid or salts thereof, and methacrylic acid esters such as methyl methacrylate, ethyl methacrylate, n-propyl methacrylate and isopropyl methacrylate; acrylamide, and acrylamide derivatives such as N-methylacrylamide and N-ethylacrylamide; methacrylamide, and methacrylamide derivatives such as N-methylmethacrylamide and N-ethylmethacrylamide; vinyl ethers such as methyl vinyl ether, ethyl vinyl ether, n-propyl vinyl ether, isopropyl vinyl ether and n-butyl vinyl ether; hydroxy group-containing vinyl ethers such as ethylene glycol vinyl ether, 1,3-propanediol vinyl ether and 1,4-butanediol vinyl ether; allyl acetate; allyl ethers such as propyl allyl ether, butyl allyl ether and hexyl allyl ether; monomers having an oxyalkylene group; isopropenyl acetate; hydroxy group-containing α-olefins such as 3-buten-1-ol, 4-penten-1-ol, 5-hexen-1-ol, 7-octen-1-ol, 9-decen-1-ol and 3-methyl-3-buten-1-ol; monomers having a sulfonic acid group such as ethylenesulfonic acid, allylsulfonic acid, methallylsulfonic acid and 2-acrylamido-2-methylpropanesulfonic acid; monomers having a cationic group such as vinyloxyethyltrimethylammonium chloride, vinyloxybutyltrimethylammonium chloride, vinyloxyethyldimethylamine, vinyloxymethyldiethylamine, N-acrylamidomethyltrimethylammonium chloride, N-acrylamidoethyltrimethylammonium chloride, allyltrimethylammonium chloride, methallyltrimethylammonium chloride, dimethylallylamine and allylethylamine; and the like. The amount of these monomers used may vary depending on their purposes of use and intended usages and the like, and is typically 20 mol % or less, and preferably 10 mol % or less with respect to all the monomers used in the copolymerization.

The vinyl ester polymer produced by the copolymerization is then saponified in a solvent according to a well-known method, and derived to PVA (A).

An alkaline substance is typically used as a catalyst for the saponification reaction, and examples thereof include alkali metal hydroxides such as potassium hydroxide and sodium hydroxide, and alkali metal alkoxides such as sodium methoxide, and the like. The amount of the alkaline substance used, in terms of molar ratio with respect to the vinyl ester monomer unit in the vinyl ester polymer, falls preferably within a range of 0.004 to 0.5, and more preferably within a range of 0.005 to 0.05. In addition, the total amount of the catalyst may be added in the initial stage of the saponification reaction, or a portion of the catalyst may be added in the initial stage of the saponification reaction, followed by the addition of the rest of the catalyst during the saponification reaction.

The solvent that may be used in the saponification reaction is exemplified by methanol, methyl acetate, dimethyl sulfoxide, diethyl sulfoxide, dimethylformamide, and the like. Among these solvents, methanol is preferred. In addition, when methanol is used, a moisture content of methanol is preferably adjusted to 0.001 to 1% by mass, more preferably 0.003 to 0.9% by mass, and particularly preferably 0.005 to 0.8% by mass.

The saponification reaction is carried out at a temperature of preferably 5 to 80° C., and more preferably 20 to 70° C. The period of time required for the saponification reaction is preferably 5 min to 10 hours, and more preferably 10 min to 5 hours. The saponification reaction can be carried out in either a batchwise system or a continuous system. After completion of the saponification reaction, the remaining saponification catalyst may be neutralized, as needed, and examples of a neutralizing agent that can be used include organic acids such as acetic acid and lactic acid, and ester compounds such as methyl acetate, and the like.

PVA (A) produced by the saponification reaction may be washed, as needed. Examples of a washing liquid used in the washing include lower alcohols such as methanol, lower fatty acid esters such as methyl acetate, mixtures thereof, and the like. A small amount of water, an alkali, an acid, or the like may be added to the washing liquid.

The proportion of PVA (A) contained in the composition is not particularly limited, and is exemplified by 1% by mass or greater and 99% by mass or less; however, when the composition is used as a coating agent, the proportion of PVA (A) contained in the composition is preferably 1% by mass or greater and 20% by mass or less. Such a coating agent can effectively improve the strength, the water resistance and the like of the resultant coating film.

Compound (B)

The compound (B) is a compound having a silicon atom, a titanium atom, a zirconium atom or a combination thereof.

According to the composition, the compound (B) functions as a preferable crosslinking agent for PVA (A), whereby the water resistance and the blocking resistance of the resultant coating film can be improved.

Examples of the compound having a silicon atom include a compound having a silyl group (a silane compound), silica, a silicic acid salt, and the like. The silane compound and silica are preferred in light of the exertion of superior crosslinkability.

The silane compound is exemplified by a compound having at least one hydrolyzable group and at least one nonhydrolyzable organic group each directly bound to the silicon atom (i.e., a silane coupling agent), and a hydrolytically condensed oligomer of such a compound.

Examples of the hydrolyzable group include an alkoxyl group, an acyloxyl group, an aryloxy group, an aminoxy group, an amide group, a ketoxime group, an isocyanate group, a halogen atom, and the like. Among these, a group derived from a monovalent alcohol by removing a hydrogen atom of a hydroxyl group of the monovalent alcohol, such as an alkoxyl group, is preferred. Furthermore, an alkoxyl group having 4 or less carbon atoms, particularly having 1 or 2 carbon atoms is preferred. In addition, the number of the hydrolyzable groups bound to one silicon atom is 1 to 3, preferably 2 to 3, and more preferably 3.

The nonhydrolyzable organic group is bound to the silicon atom at a terminal carbon atom. Examples of the organic group include a hydrocarbon group such as an alkyl group such as a methyl group, an ethyl group and a propyl group; an aryl group such as a phenyl group; and the like. At least one of the organic groups preferably has a functional group. Examples of the functional group include an amino group, an epoxy group, a mercapto group, an isocyanate group, and the like.

Specific Examples of the silane compound include tetramethoxysilane, tetraethoxysilane, 3-glycidoxypropyltrimethoxysilane, 2-(3,4-epoxycyclohexyl)ethyltrimethoxysilane, 3-aminopropyltrimethoxysilane, 3-aminopropyltriethoxysilane, 4-aminobutyltriethoxysilane, p-aminophenyltrimethoxysilane, 3-(2-aminoethylamino) propyltrimethoxysilane, 3-(2-aminoethylamino)propyltriethoxysilane, aminoethylaminomethylphenethyltrimethoxysilane, N-(6-aminohexyl) aminopropyltrimethoxysilane, 3-chloropropyltrimethoxysilane, 3-chloropropyltrichlorosilane, (p-chloromethyl)phenyltrimethoxysilane, 4-chlorophenyltrimethoxysilane, 3-methacryloxypropyltrimethoxysilane, 3-methacryloxypropyltriethoxysilane, 3-acryloxypropyltrimethoxysilane, styrylethyltrimethoxysilane, 3-mercaptopropyltrimethoxysilane, vinyltrimethoxysilane, vinyltriethoxysilane, vinyltrichlorosilane, vinyltriacetoxysilane, vinyltris(2-methoxyethoxy)silane, hydrolytically condensed oligomers thereof, and the like. Among these, a silane compound having an amino group, in particular 3-(2-aminoethylamino)propyltrimethoxysilane and 3-(2-aminoethylamino)propyltriethoxysilane are preferred in light of even further improvement of the water resistance of the resultant coated article.

The silica is preferably colloidal silica. The colloidal silica is exemplified by dispersions prepared by dispersing fine particles of silica having a particle size of 200 nm or less in water or an organic solvent such as an alcohol. Commercially available products of such colloidal silica are typified by, for example, products manufactured by Nissan Chemical Industries, Ltd., and specific examples thereof include Snowtex 20, 30, 40, N, O, UP, C, S, OS, XS, PS—S, PS-M, and the like.

Examples of the compound having a titanium atom include an inorganic compound such as titanium oxide, and an organic titanium compound. Organic titanium compounds are preferred in light of the exertion of superior crosslinkability. Examples of the organic titanium compounds include isopropyl triisostearoyl titanate, isopropyl tridodecylbenzenesulfonyl titanate, isopropyl tris(dioctyl pyrophosphate) titanate, bis(dioctyl pyrophosphate)oxyacetate titanate, bis (dioctyl pyrophosphate) ethylene titanate, diisopropylbis (dioctyl pyrophosphate) titanate, tetraisopropylbis(dioctyl phosphite) titanate, tetraoctylbis(ditridecyl phosphite) titanate, tetra(2,2-diallyloxymethyl-1-butyl)bis(ditridecyl phosphite) titanate, isopropyl tridodecylbenzenesulfonyl titanate, isopropyl tris(dioctyl pyrophosphate) titanate, bis(dioctyl pyrophosphate)oxyacetate titanate, bis(dioctyl pyrophosphate)ethylene titanate, diisopropylbis(dioctyl pyrophosphate) titanate, tetraisopropyl titanate, tetra-n-butyl titanate, butyl titanate dimer, tetra(2-ethylhexyl)titanate, tetramethyl titanate, titanium acetylacetonate, titanium tetraacetylacetonate, polytitanium acetylacetonate, titanium octylene glycolate, titanium lactate ammonium salt, titanium lactate, titanium triethanolaminate, polyhydroxy titanium stearate, and the like. Among these, water-soluble organic titanium compounds such as titanium lactate are preferred.

The compound having a zirconium atom is preferably exemplified by compounds that are water-soluble or converted to water-soluble species by an acid. Examples of such a zirconium compound include zirconium halides such as zirconium oxychloride, zirconium hydroxychloride, zirconium tetrachloride and zirconium bromide; zirconium salts of mineral acids such as zirconium sulfate and zirconium nitrate; zirconium salts of organic acids such as zirconyl acetate and zirconyl formate; zirconium complex salts such as zirconium ammonium carbonate, sodium zirconium sulfate, zirconium ammonium acetate, sodium zirconium oxalate and zirconium ammonium citrate; and the like. Among these, zirconium complex salts are preferred, and zirconium ammonium carbonate is more preferred.

As the compound (B), one of the compounds exemplified above may be used alone, or two or more types thereof may be used in combination. Among the examples of the compound (B), a silane compound, colloidal silica, an organic titanium compound, a zirconium complex salt or a combination thereof is preferred, and a silane coupling agent, a hydrolytically condensed oligomer of a silane coupling agent, colloidal silica, an organic titanium compound, a zirconium complex salt or a combination thereof is more preferred.

The content of the compound (B) with respect to 100 parts by mass of PVA (A) is 0.01 parts by mass or greater and 900 parts by mass or less, preferably 0.1 parts by mass or greater and 500 parts by mass or less, more preferably 2 parts by mass or greater and 100 parts by mass or less, and still more preferably 3 parts by mass or greater and 20 parts by mass or less. When the content of the compound (B) is less than the lower limit, a crosslinking reaction involving the compound (B) does not proceed sufficiently, and the water resistance, the blocking resistance and the like of the resultant coating film are less likely to be improved. To the contrary, when the content of the compound (B) exceeds the upper limit, preparation of a homogeneous composition may be difficult, and/or a coating film having superior water resistance and the like is less likely to be obtained because of deterioration of workability and/or storage stability, relative reduction of the content of PVA (A), and the like.

Polyamide Polyamine Epichlorohydrin-Based Resin (C)

The composition according to the embodiment of the present invention preferably further comprises a polyamide polyamine epichlorohydrin-based resin (C). When the composition further comprises the polyamide polyamine epichlorohydrin-based resin (C) in addition to the compound (B), the resultant coating film is less likely to be peeled from a substrate, and more specifically, a coated article having even more superior water resistance can be obtained. Although the reasons for the exertion of such effects are not fully elucidated, it is presumed, for example, that at least a part of the polyamide polyamine epichlorohydrin-based resin (C) is incorporated into a cross-linked structure formed by PVA (A), whereby the cross-linked structure formed by PVA (A) is converted to a more flexible and tougher structure.

The polyamide polyamine epichlorohydrin-based resin as referred to means a resin produced by reacting polyamide polyamine with epichlorohydrin, and furthermore various types of modifications may be made thereto. The polyamide polyamine epichlorohydrin-based resin (C) is preferably a polyamide polyamine epichlorohydrin resin produced by reacting the polyamide polyamine with epichlorohydrin in light of further improvement of the water resistance of the coated article, more preferably a polyamide polyamine epichlorohydrin resin having an azetidinium group and/or epoxy group as well as an amino group, and still more preferably a polyamide polyamine epichlorohydrin resin having an azetidinium group and an amino group. As the polyamide polyamine epichlorohydrin-based resin (C), one of the resins exemplified above may be used alone, or two or more types thereof may be used in combination.

Although the content of the polyamide polyamine epichlorohydrin-based resin (C) is not particularly limited, the content of the polyamide polyamine epichlorohydrin-based resin (C) with respect to 100 parts by mass of PVA (A) is preferably 0.2 parts by mass or greater and 150 parts by mass or less, more preferably 1 part by mass or greater and 100 parts by mass or less, and still more preferably 10 parts by mass or greater and 50 parts by mass or less. When the content of the polyamide polyamine epichlorohydrin-based resin (C) is less than the lower limit, the effects exerted by incorporating the polyamide polyamine epichlorohydrin-based resin (C) may not be sufficiently exhibited. To the contrary, when the content of the polyamide polyamine epichlorohydrin-based resin (C) exceeds the upper limit, the water resistance and the like of the resultant coating film may be deteriorated due to relative reduction of the content of PVA (A).

Other Component, etc.

The composition may comprise water as a solvent or a dispersion medium. In addition, other solvent may be comprised in place of water or together with water. Examples of the other solvent include alcohols such as ethanol, ethers such as diethyl ether, and the like. Other components that may be comprised in the composition are exemplified by components described later according to intended usages.

Although the solid content concentration of the composition in a case where the composition comprises the solvent or the dispersion medium is not particularly limited, the solid content concentration of the composition is preferably 1% by mass or greater and 30% by mass or less in light of application properties during the use as a coating agent, formability of coating films and the like.

Although the pH of the composition is not particularly limited, the pH is preferably 4 or greater and 8 or less. Due to superior solubility in water of PVA (A) used, the composition can be prepared as a homogeneous aqueous solution without particularly adding an alkali such as sodium hydroxide or an acid to water, leading to superior handleability. In addition, according to the composition, sufficient viscosity stability can be exhibited even in a neutral pH region.

Coating Agent

The coating agent according to an embodiment of the present invention comprises the composition. The coating agent typically comprises water as a solvent or a dispersion medium, and may comprise the aforementioned other solvent in addition to water. When the coating agent is used, a coating film exhibiting superior water resistance, blocking resistance and the like can be produced. Specifically, the coating agent can be used, for example, as clear coating agents; white or colored coating agents containing a pigment and the like; as well as coating agents for forming an ink-receiving layer in ink jet recording materials; coating agents for forming an overcoat layer or a thermal coloring layer and the like in thermal recording materials; coating agents for forming a sealing layer in a base paper for a release paper; and the like.

It is to be noted that the composition can be used in intended usages other than the coating agent. Examples of the intended usages include adhesives, thickening agents, film materials, and the like.

Coated Article and Method for Production Thereof

The coated article according to an embodiment of the present invention is a coated article provided by applying the coating agent on the surface of a substrate. The coated article exhibits superior water resistance, blocking resistance, and the like, since the coated article has the coating agent provided thereon. Examples of the coated article include thermal recording materials, ink jet recording materials, base papers for a release paper, other coated papers, and the like. In addition, the present method for producing a coated article comprises applying the coating agent on the surface of a substrate. The method for production enables the coated article to be easily provided.

Although the substrate is not particularly limited, examples thereof include papers (including synthetic papers), fabrics, wooden boards, metal plates, films, and the like. Among these, papers are preferred in light of a possibility of allowing the coating agent to penetrate into the interior of the substrate, and preferably improving, for example, the water resistance, and the like.

Although the method for application is not particularly limited, well-known means such as size presses, air knife coaters, roll coaters, bar coaters, blade coaters, curtain coaters and cast coaters can be employed.

The coated article typically comprises a substrate, and coating layer (coating film) provided by applying the coating agent on at least one face of the substrate; however, other layer may be further provided between the substrate and the coating layer, or on the surface of the coating layer. In this regard, in order for superior water resistance and the like of the coated article to be preferably exhibited, it is preferred that the coating layer is provided on the outermost surface.

Thermal Recording Material

The thermal recording material according to an embodiment of the present invention has a layer structure, for example, in which a substrate, a thermal coloring layer and an overcoat layer are laminated in this order. At least one of the thermal coloring layer and the overcoat layer are preferably provided as a coating layer that is formed by applying the coating agent, and more preferably the overcoat layer is provided by applying the coating agent. According to such a configuration, the layers of the thermal recording material can be produced from the composition, and the water resistance and the blocking resistance can be more effectively improved.

Substrate

Any conventionally well-known transparent or opaque supporting base material can be used as the substrate of the thermal recording material. Examples of the transparent supporting base material include sheets and films made of polyesters, polystyrene, polyvinyl chloride, polymethyl methacrylate, cellulose acetate, polycarbonates, polyimides, cellophanes, celluloids or the like, highly transparent papers, and the like. Examples of the opaque supporting base material include normal papers, pigment-coated papers, fabrics, woods, metal plates, synthetic papers, opacified synthetic resin-based films, sheets, and the like. Among these, papers are preferred in light of a possibility of allowing the composition to penetrate into the interior of the substrate paper, and suitably enhancing, for example, the water resistance, and the like.

Composition for Use as Coating Agent for Thermal Recording Material

Examples of other components that may be comprised in a case where the composition is used as a coating agent for a thermal recording material include the following. Specifically, examples of the other components in a case where an overcoat layer is provided include a crosslinking agent, a water-soluble resin, a water-dispersible resin, a lubricant, a filler, and the like, whereas examples of the other components in a case where the thermal coloring layer is provided include a thermal dye, a color developer, a crosslinking agent, a water-soluble resin, a water-dispersible resin, a lubricant, a filler, and the like.

The crosslinking agent is exemplified by an aldehyde compound such as glyoxal and glutaraldehyde, polyoxazoline, and the like. When the composition for use in forming the thermal coloring layer, the overcoat layer or the like further comprises the crosslinking agent as described above, the water resistance, the blocking resistance and the like of the resultant thermal recording material can be more improved.

Examples of the water-soluble resin include starch and derivatives thereof, cellulose derivatives such as hydroxymethylcellulose, hydroxyethylcellulose, carboxymethylcellulose, methylcellulose and ethylcellulose; gum arabic, polyvinyl alcohol, alkali metal salts (sodium salts and the like) of polyacrylic acid, polyvinylpyrrolidone, (meth)acrylamide-(meth)acrylic acid ester copolymers, (meth)acrylamide-(meth)acrylic acid ester-(meth)acrylic acid ternary copolymers, alkali metal salts (sodium salts and the like) of styrene-maleic anhydride copolymers, alkali metal salts (sodium salts and the like) of isobutylene-maleic anhydride copolymers, polyacrylamide, sodium alginate, gelatin, casein, and the like.

Examples of the water-dispersible resin include polyvinyl acetate, polyurethanes, polyacrylic acid, polyacrylic acid esters, vinyl chloride-vinyl acetate copolymers, polybutyl methacrylate, ethylene-vinyl acetate copolymers, styrene-butadiene copolymers, styrene-butadiene-acrylic acid copolymers, and the like.

Examples of the lubricant include higher aliphatic acids, higher aliphatic acid amides, higher aliphatic acid metal salts, paraffin waxes, microcrystalline waxes, and the like.

Examples of the filler include calcium carbonate particles, zinc oxide particles, aluminum oxide particles, colloidal alumina, aluminum hydroxide particles, pseudoboehmite, satin white, organic pigments, polystyrene fine particles, polyvinyl acetate-based fine particles, urea-formalin resin fine particles, and the like. It is to be noted that a preferred percentage content of the filler is 20% by mass or greater with respect to the total solid content of each layer. When the percentage content is less than 20% by mass, the water resistance and the blocking resistance may be deteriorated.

Although the thermal dye is not particularly limited, examples thereof include: triarylmethane compounds such as 3,3-bis(p-dimethylaminophenyl)-6-dimethylaminophthalide (crystal violet lactone), 3-(p-dimethylaminophenyl)-3-(1,2-dimethylindol-3-yl)phthalide, 3-(p-dimethylaminophenyl)-3-(2-phenylindol-3-yl)phthalide and 3,3-bis-(9-ethylcarbazol-3-yl)-5-dimethylaminophthalide; diphenylmethane compounds such as 4,4'-bisdimethylaminobenzhydrin benzyl ether and N-halophenylleucoauramine; xanthene compounds such as rhodamine B-anilinolactam, 3-diethylamino-7-benzylaminofluoran, 3-diethylamino-7-butylaminofluoran, 3-diethylamino-7-(chloroanilino)fluoran, 3-diethylamino-6-methyl-7-anilinofluoran, 3-piperidino-6-methyl-7-anilinofluoran, 3-ethyl-tolylamino-6-methyl-7-anilinofluoran, 3-cyclohexyl-methylamino-6-methyl-7-anilinofluoran, 3-diethylamino-6-chloro-7-($\beta$-ethoxyethyl)aminofluoran, 3-diethylamino-6-chloro-7-($\gamma$-chloropropyl)aminofluoran, 3-(N-ethyl-N-isoamyl)-6-methyl-7-phenylaminofluoran and 3-dibutylamino-6-methyl-7-anilinofluoran; thiazine compounds such as benzoyl leuco methylene blue and p-nitrobenzoyl leuco methylene blue; spiro compounds such as 3-methyl-spiro-dinaphthopyran, 3-ethyl-spiro-dinaphthopyran, 3-benzyl-spiro-dinaphthopyran, 3-methylnaphtho-(3-methoxybenzo)-spiropyran; and the like. These thermal dyes maybe appropriately selected in accordance with intended usages of the thermal recording material, and the like, and may be used either alone or as a mixture of two or more types thereof.

Although the color developer is not particularly limited, phenol derivatives and aromatic carboxylic acid derivatives are preferred, and bisphenols are particularly preferred. Specific examples of the phenol derivatives include p-octylphenol, p-tert-butylphenol, p-phenylphenol, 1,1-bis(p-hydroxyphenyl)propane, 2,2-bis(p-hydroxyphenyl)propane, 1,1-bis(p-hydroxyphenyl)pentane, 1,1-bis(p-hydroxyphenyl)hexane, 2,2-bis(p-hydroxyphenyl)hexane, 1,1-bis(p-hydroxyphenyl)-2-ethyl-hexane, 2,2-bis(4-hydroxy-3,5-dichlorophenyl)propane, dihydroxydiphenyl ether, and the like. Specific examples of the aromatic carboxylic acid derivatives include p-hydroxybenzoic acid, ethyl p-hydroxybenzoate, butyl p-hydroxybenzoate, 3,5-di-tert-butylsalicylic acid, 3,5-di-$\alpha$-methylbenzylsalicylic acid, multivalent metal salts of the aforementioned carboxylic acids, and the like.

For example, in a case of the overcoat layer, the amount of the coating agent applied may be appropriately selected within a range not leading to inhibition of heat transfer from a thermal head of a thermal recording apparatus to the thermal coloring layer of the thermal recording material, and is typically 1 to 10 g/m$^2$, and preferably 2 to 7 g/m$^2$ in terms of solid content equivalent.

It is to be noted that the thermal recording material may comprise other layer in addition to the substrate, the thermal coloring layer and the overcoat layer. The other layer is exemplified by an undercoat layer between the substrate and the thermal coloring layer. Even in such a case, the thermal recording material can exhibit superior water resistance and blocking resistance.

Ink Jet Recording Material

The inkjet recording material according to an embodiment of the present invention comprises a substrate and an ink-receiving layer provided on the surface of the substrate, and the ink-receiving layer is preferably provided by applying the coating agent according to the embodiment of the present invention.

Substrate

Any conventionally well-known transparent or opaque supporting base material can be used as the substrate of the ink jet recording material. Examples of the transparent supporting base material include sheets and films made of polyesters, polystyrene, polyvinyl chloride, polymethyl methacrylate, cellulose acetate, polycarbonates, polyimides, cellophanes, celluloids or the like, highly transparent papers, and the like. Examples of the opaque supporting base material include normal papers, pigment-coated papers, fabrics, woods, metal plates, synthetic papers, opacified synthetic resin-based films, sheets, and the like.

Composition for Use as Coating Agent for Ink Jet Recording Material

When the composition is used as a coating agent for an ink jet recording material, the composition may further comprise other components such as a crosslinking agent, a water-soluble resin, a water-dispersible resin, a filler and a fixative for inks.

The crosslinking agent is exemplified by an aldehyde compound such as glyoxal and glutaraldehyde, polyoxazoline, and the like. When the composition for forming an ink-receiving layer and the like further comprises the aforementioned crosslinking agent, coating film strength, water resistance and the like of the resultant ink jet recording material can be more improved.

Examples of the water-soluble resin include starch and derivatives thereof, cellulose derivatives such as hydroxymethylcellulose, hydroxyethylcellulose, carboxymethylcellulose, methylcellulose and ethylcellulose; gum arabic, polyvinyl alcohol, alkali metal salts (sodium salts and the like) of polyacrylic acid, polyvinylpyrrolidone, (meth)acrylamide-(meth)acrylic acid ester copolymers, (meth)acrylamide-(meth)acrylic acid ester-(meth)acrylic acid ternary copolymers, alkali metal salts (sodium salts and the like) of styrene-maleic anhydride copolymers, alkali metal salts (sodium salts and the like) of isobutylene-maleic anhydride copolymers, polyacrylamide, sodium alginate, gelatin, casein, and the like.

Examples of the water-dispersible resin include polyvinyl acetate, polyurethanes, polyacrylic acid, polyacrylic acid esters, vinyl chloride-vinyl acetate copolymers, polybutyl methacrylate, ethylene-vinyl acetate copolymers, styrene-butadiene copolymers, styrene-butadiene-acrylic acid copolymers, and the like.

Examples of the filler include calcium carbonate particles, zinc oxide particles, aluminum oxide particles, colloidal alumina, aluminum hydroxide particles, pseudoboehmite, satin white, organic pigments, polystyrene fine particles, polyvinyl acetate-based fine particles, urea-formalin resin fine particles, and the like. Although the ratio of PVA (A) to the filler is not particularly limited, typically, the mass ratio of PVA (A)/filler preferably falls within a range of 3/100 or greater and 100/100 or less, more preferably within a range of 5/100 or greater and 80/100 or less, still more preferably within a range of 6/100 or greater and 30/100 or less, and particularly preferably within a range of 7/100 or greater and 20/100 or less. According to the coating agent for an ink jet recording material, when the amount of PVA (A) used with respect to the filler is thus reduced, the coating film strength and the water resistance are favorable, and the generation of printing unevenness can be also inhibited. It is to be noted that when the mass ratio of PVA (A)/filler is too large or too small, the printing unevenness is likely to occur. In addition, a smaller mass ratio of PVA (A)/filler may lead to deterioration of the coating film strength.

The fixative is exemplified by cationic resins. The cationic resins as referred to are a monomer, an oligomer or a polymer, preferably an oligomer or a polymer, that has a primary to tertiary amine or a quaternary ammonium salt that is dissociated and develops a cationic character when being dissolved in water. Specific examples of the cationic resins include dimethylamine-epichlorohydrin polycondensates, acrylamide-diallylamine copolymers, polyvinylamine copolymers, dimethyldiallylammonium chloride polymers, polyethylene imine, and the like.

Although the amount of the coating agent applied is not particularly limited, the amount of the coating agent in terms of solid content equivalent is preferably 3 $g/m^2$ or greater and 30 $g/m^2$ or less, and more preferably 5 $g/m^2$ or greater and 20 $g/m^2$ or less. When the coating agent is thus applied on the substrate to provide a coating layer containing PVA (A), an ink jet recording material having superior water resistance, binder force to inorganic substances, coating film strength and the like can be produced.

It is to be noted that the ink jet recording material may comprise, in addition to the substrate and the ink-receiving layer, other layer or the like, for example, between the substrate and the ink-receiving layer. In addition, the ink jet recording material may comprise PVA (A) in the substrate. Even in such a case, the ink jet recording material can exhibit superior coating film strength, water resistance and the like.

Base Paper for Release Paper

The base paper for a release paper according to an embodiment of the present invention comprises, for example, a paper substrate, and a coating layer (sealing layer) provided on the surface of the paper substrate. The coating layer is preferably provided by applying the coating agent according to the embodiment of the present invention. According to such a configuration, the coating layer of the base paper for a release paper can be provided from PVA (A) and the like, and the sealability, the water resistance and the like can be improved more effectively.

Paper Substrate

As the paper substrate of the base paper for a release paper, a well-known paper or synthetic paper prepared using a chemical pulp such as a hardwood kraft pulp and a softwood kraft pulp, a mechanical wood pulp such as GP, RGP and TMP, and the like may be used. The paper substrate includes premium quality papers, medium quality papers, alkaline papers, glassine papers, semi-glassine papers and the like, and the semi-glassine papers are preferred.

Although the grammage of the paper substrate is not particularly limited, the grammage is preferably 10 $g/m^2$ or greater and 120 $g/m^2$ or less, and more preferably 40 $g/m^2$ or greater and 100 $g/m^2$ or less in light of sealability, handleability and the like of the resultant base paper for a release paper.

Composition for Use as Coating Agent for Base Paper for Release Paper

Examples of other components that may be contained in a case where the composition is used as a coating agent for a base paper for a release paper include a crosslinking agent, a water-soluble resin, a water-dispersible resin, a filler, a surfactant (nonionic, anionic, and the like), a lubricant, a defoaming agent, a dispersant, a humectant, a pH adjusting agent, an ultraviolet ray absorbing agent, and the like.

The crosslinking agent is exemplified by an aldehyde compound such as glyoxal and glutaraldehyde, polyoxazoline, and the like. When the composition for forming the coating layer and the like further comprises the crosslinking agent as described above, the sealability, the water resistance and the like of the resultant base paper for a release paper can be more improved.

Examples of the water-soluble resin include starch and derivatives thereof; cellulose derivatives such as hydroxymethylcellulose, hydroxyethylcellulose, carboxymethylcellulose, methylcellulose and ethylcellulose; gum arabic, polyvinyl alcohol, alkali metal salts (sodium salts and the like) of polyacrylic acid, polyvinylpyrrolidone, (meth)acrylamide-(meth)acrylic acid ester copolymers, (meth)acrylamide- (meth)acrylic acid ester-(meth)acrylic acid ternary copolymers, alkali metal salts (sodium salts and the like) of styrene-maleic anhydride copolymers, alkali metal salts (sodium salts and the like) of isobutylene-maleic anhydride copolymers, polyacrylamide, sodium alginate, gelatin, casein, and the like.

Examples of the water-dispersible resin include polyvinyl acetate, polyurethanes, polyacrylic acid, polyacrylic acid esters, vinyl chloride-vinyl acetate copolymers, polybutyl methacrylate, ethylene-vinyl acetate copolymers, styrene-butadiene copolymers, styrene-butadiene-acrylic acid copolymers, and the like.

Examples of the filler include calcium carbonate particles, zinc oxide particles, aluminum oxide particles, colloidal alumina, aluminum hydroxide particles, pseudoboehmite, satin white, organic pigments, polystyrene fine particles, polyvinyl acetate-based fine particles, urea-formalin resin fine particles, and the like.

Although the amount of the coating agent applied is not particularly limited, the amount of the coating agent is preferably 0.1 $g/m^2$ or greater and 3 $g/m^2$ or less, and more preferably 0.2 $g/m^2$ or greater and 2 $g/m^2$ or less (per side in a case where the applying is carried out on both sides). When the amount of the coating agent applied is less than the lower limit, sufficient sealability and water resistance may be unlikely to be exhibited. To the contrary, when the amount of the coating agent applied exceeds the upper limit, application properties of the coating agent may be deteriorated, and/or the applying process may be uneconomical.

After the application of the coating agent, a drying treatment is typically carried out. The drying may be executed using a method involving, for example, a hot air, an infrared light, a heating cylinder or a combination thereof. In addition, the sealability and the like of the dried base paper for a release paper may be further improved by subjecting it to humidity conditioning and a calendar treatment, particularly a supercalendar treatment. The humidity conditioning is preferably carried out so as to give a moisture content in paper of 10 to 30% by mass. In addition, calendar treatment conditions involving a roll temperature of a normal temperature to 200° C. and a linear pressure between the rolls of 20 to 350 kg/cm are preferred.

The air resistance (hereinafter, may be also referred to as "air permeance") of the base paper for a release paper is preferably 10,000 sec or greater, more preferably 30,000 sec or greater, still more preferably 50,000 sec or greater, and particularly preferably 100,000 sec or greater. When the air permeance is less than 10,000 sec, the sealability against an overcoating agent to be applied on the base paper for a release paper may be insufficient. The air permeance is determined in accordance with JIS-P8117 using an Oken type smoothness and air-permeability tester.

It is to be noted that the base paper for a release paper may comprise, in addition to the paper substrate and the coating layer, other layer or the like, for example, between the paper substrate and the coating layer. In addition, the base paper for a release paper may comprise the composition in the paper substrate. Even in such a case, the base paper for a release paper can exhibit superior sealability and water resistance.

A release paper can be produced by applying on the base paper for a release paper, as the overcoating agent, a releasing agent for providing a release layer. Examples of the releasing agent include solvent type silicones, and non-solvent type (emulsion type, oligomer type) silicones. Examples of the solvent contained in the releasing agent include organic solvents such as toluene.

In addition, a laminate having releasing properties can be provided by applying on the release layer of the release paper, as the overcoating agent, a tacky material for providing a tacky layer. The tacky material is exemplified by solvent type tacky materials and emulsion type tacky materials.

EXAMPLES

Hereinafter, the embodiments of the present invention will be explained in detail by way of Examples, but the present invention is not in any way limited thereto. In addition, in the following Examples and Comparative Examples, parts and percentages indicate parts by mass and % by mass, respectively, unless otherwise specified.

It is to be noted that monomers having a silyl group (monomer A) used in Examples and Comparative Examples are as follows:

MAmPTMS: 3-methacrylamidopropyltrimethoxysilane;
MAmOTMS: 8-methacrylamidopropyltrimethoxysilane;
MAmDDTMS: 12-methacrylamidododecyltrimethoxysilane;
MAmODTMS: 18-methacrylamidooctadecyltrimethoxysilane;
4-PTMS: 4-pentenyltrimethoxysilane;
VMS: vinyltrimethoxysilane;
MAmMTMS: methacrylamidomethyltrimethoxysilane; and
AMPTMS: 2-acrylamido-2-methylpropyltrimethoxysilane.

In addition, the compound (B) and the polyamide polyamine epichlorohydrin-based resin (C) used in Examples and Comparative Examples are as follows Ti compound: titanium lactate (manufactured by Matsumoto Chemical Industry Co., Ltd.: TC-310);
Zr compound: zirconium ammonium carbonate (manufactured by Daiichi Kigenso Kagaku Kogyo Co., Ltd.: Zircosol AC-7);
Si compound 1: 3-(2-aminoethylamino)propyltrimethoxysilane (manufactured by Shin-Etsu Chemical Co., Ltd.: KBM-603);
Si compound 2: colloidal silica (manufactured by Nissan Chemical Industries, Ltd.: Snowtex C);
Si compound 3: silane oligomer (manufactured by Shin-Etsu Chemical Co., Ltd.: KRM-7201); and
PAE: polyamide polyamine epichlorohydrin resin (manufactured by Seiko PMC Corporation: WS-4020).

Synthesis of Silyl Group-Containing PVA

PVAs were produced according to the following method, and the degree of saponification, the percentage content (S) of the monomer unit having a group represented by the above formula (1) (in several Examples, corresponding to the percentage content of the monomer unit having a silyl group), and the viscosity average degree of polymerization (P) of the PVAs were determined.

Method of Analysis of PVAs

Analysis of the PVAs was carried out in accordance with the method specified in JIS-K6726, unless otherwise specified.

Synthesis Example 1

Production of PVA 1

Into a 6 L separable flask equipped with a stirrer, a reflux condenser, a nitrogen inlet tube, a comonomer dripping port and an addition port of the initiator were charged 1,500 g of vinyl acetate, 500 g of methanol, and 1.87 g of MAmPTMS as the monomer having a group represented by the above formula (1) (monomer A), and replacement with nitrogen gas in the system was carried out for 30 min by nitrogen bubbling. Also, a comonomer solution was prepared as a delay solution by dissolving MAmPTMS in methanol to give a concentration of 8%, and subjected to replacement with nitrogen by bubbling of nitrogen gas. An elevation of the temperature of the reaction vessel was started, and 0.8 g of 2,2'-azobisisobutyronitrile (AIBN) was added to initiate the polymerization when an internal temperature of 60° C. was attained. The polymerization was allowed to proceed at 60° C. for 2.7 hours while adding the delay solution dropwise such that the monomer composition (proportion of vinyl acetate and the monomer A (MAmPTMS)) was kept constant in the polymerization solution, followed by cooling to stop the polymerization. The total amount of the comonomer solution added until the polymerization was stopped (consecutively added liquid) was 99 g. In addition, the solid content concentration was 29.0% when the polymerization was stopped. Subsequently, unreacted vinyl acetate monomer was eliminated at 30° C. under a reduced pressure while adding methanol at intervals to obtain a methanol solution of polyvinyl acetate (PVAc) having a group represented by the above formula (1) at a concentration of 40%. Furthermore, to this methanol solution were added methanol and a methanol solution containing sodium hydroxide at a concentration of 10% by mass in this order with stirring so that the molar ratio of sodium hydroxide to the vinyl acetate unit in the PVAc of 0.04 and the solid content concentration of PVAc of 30% by mass were attained, whereby a saponification reaction was started at 40° C. Gelatinous matter was produced about 5 min after the alkali solution was added. The gelatinous matter was ground with a grinder, and left to stand at 40° C. for 1 hour to allow the saponification to proceed. Thereafter, methyl acetate was added to neutralize remaining alkali. After confirming the completion of the neutralization using a phenolphthalein indicator, the mixture was filtered to obtain a white solid. Methanol was added to the white solid, and the mixture was left to stand at room temperature for 3 hours to permit washing. After this washing operation was repeated three times, a white solid obtained by deliquoring via centrifugation was left to stand in a dryer at 65° C. for 2 days to obtain PVA 1 having a group represented by the above formula (1). PVA 1 had a viscosity average degree of polymerization (P) of 1,700 and a degree of saponification of 98.6 mol %.

The percentage content of the monomer unit having a group represented by the above formula (1) (percentage content of the monomer unit having a silyl group) in PVA 1 thus obtained was determined by proton NMR of the PVAc which was a precursor of the PVA. More specifically, the obtained PVAc was subjected to thorough purification by reprecipitation in n-hexane/acetone at least three times, and dried at 50° C. under a reduced pressure for 2 days to prepare PVAc for analysis. The PVAc was dissolved in $CDCl_3$, and subjected to measurement using a proton NMR (JEOL GX-500) at 500 MHz at room temperature. The percentage content (S) of the monomer unit having a group represented by the formula (1) was calculated based on a peak $\alpha$ derived from the main chain methine of the vinyl acetate unit (4.7 to 5.2 ppm) and a peak $\beta$ derived from the methyl of the methoxy group in the monomer A unit (3.4 to 3.8 ppm) using the following formula. In PVA 1, the percentage content (S) was 0.5 mol %. Results of the analysis of the obtained PVAs are shown in Table 1.

percentage content S (mol %) of the monomer unit having a group represented by the formula (1)

={(peak area of $\beta$/9)/(peak area of $\alpha$+(peak area of $\beta$/9))}×100

Synthesis Examples 2 to 16

Production of PVAs 2 to 16

PVA 2 to PVA 16 were produced in a similar manner to Synthesis Example 1 except that: polymerization conditions such as the amount of vinyl acetate and methanol charged, and the type and amount of addition of the monomer A; and saponification conditions such as the concentration of PVAc and the molar ratio of sodium hydroxide to the vinyl acetate unit in saponification were changed as shown in Table 1. Results of analyses of each PVA obtained are shown in Table 1.

TABLE 1

| | Type of PVA | Polymerization conditions | | | | modifier | | | Saponification condition | | | Results of analyses | | | |
|---|---|---|---|---|---|---|---|---|---|---|---|---|---|---|---|
| | | vinyl acetate (g) | methanol (g) | amount of initially added initiator (g) | poly-merization time (h) | monomer A | initially added amount (g) *1 | concentration of consecutively added liquid (methanol liquid) (%) | consecutively added amount (g) | PVAc concentration (%) | NaOH molar ratio | average degree of polymerization viscosity (P) | percentage content (S) *2 (mol %) | P × S | degree of saponification (mol %) |
| Synthesis Example 1 | PVA 1 | 1,500 | 500 | 0.8 | 2.7 | MAmPTMS | 1.87 | 8 | 99 | 30 | 0.04 | 1,700 | 0.5 | 850 | 98.6 |
| Synthesis Example 2 | PVA 2 | 1,500 | 500 | 0.8 | 2.7 | MAmPTMS | 5.66 | 25 | 96 | 30 | 0.04 | 1,700 | 1.5 | 2,550 | 98.7 |
| Synthesis Example 3 | PVA 3 | 1,500 | 70 | 0.8 | 1.0 | MAmPTMS | 5.66 | 50 | 24 | 15 | 0.04 | 4,000 | 1.5 | 6,000 | 98.4 |
| Synthesis Example 4 | PVA 4 | 1,500 | 70 | 0.8 | 1.0 | MAmPTMS | 0.37 | 1 | 80 | 15 | 0.04 | 4,000 | 0.1 | 400 | 98.7 |
| Synthesis Example 5 | PVA 5 | 1,500 | 265 | 0.8 | 2.1 | MAmPTMS | 3.75 | 20 | 70 | 20 | 0.04 | 2,400 | 1.0 | 2,400 | 98.4 |
| Synthesis Example 6 | PVA 6 | 1,500 | 1,000 | 1.5 | 3.0 | MAmPTMS | 23.75 | 30 | 41 | 30 | 0.04 | 1,000 | 5.8 | 5,800 | 98.5 |
| Synthesis Example 7 | PVA 7 | 1,500 | 2,250 | 3.0 | 3.8 | MAmPTMS | 3.75 | 50 | 51 | 35 | 0.04 | 500 | 1.0 | 500 | 98.3 |
| Synthesis Example 8 | PVA 8 | 1,500 | 500 | 0.8 | 2.7 | MAmPTMS | 1.87 | 8 | 99 | 30 | 0.009 | 1,700 | 0.5 | 850 | 89.2 |
| Synthesis Example 9 | PVA 9 | 1,500 | 500 | 0.8 | 2.7 | MAmOTMS | 2.34 | 10 | 100 | 30 | 0.04 | 1,700 | 0.5 | 850 | 98.4 |
| Synthesis Example 10 | PVA 10 | 1,500 | 500 | 0.8 | 2.7 | MAmDDTMS | 2.82 | 10 | 119 | 30 | 0.04 | 1,700 | 0.5 | 850 | 98.4 |
| Synthesis Example 11 | PVA 11 | 1,500 | 500 | 0.8 | 2.7 | MAmODTMS | 3.45 | 15 | 98 | 30 | 0.04 | 1,700 | 0.5 | 850 | 98.5 |
| Synthesis Example 12 | PVA 12 | 1,500 | 500 | 0.8 | 2.7 | 4-PTMS | 14.49 | 1 | 65 | 30 | 0.03 | 1,700 | 0.5 | 850 | 98.7 |
| Synthesis Example 13 | PVA 13 | 1,500 | 500 | 0.8 | 3.0 | VMS | 11.29 | 1 | 73 | 30 | 0.03 | 1,700 | 0.5 | 850 | 98.4 |
| Synthesis Example 14 | PVA 14 | 1,500 | 500 | 0.8 | 2.9 | MAmMTMS | 1.66 | 10 | 74 | 30 | 0.03 | 1,700 | 0.5 | 850 | 98.1 |
| Synthesis Example 15 | PVA 15 | 1,500 | 500 | 0.8 | 2.8 | AMPTMS | 1.86 | 10 | 81 | 30 | 0.03 | 1,700 | 0.5 | 850 | 98.6 |
| Synthesis Example 16 | PVA 16 | 1,500 | 500 | 0.8 | 2.8 | MAmPTMS | 0.74 | 4 | 81 | 30 | 0.03 | 1,700 | 0.2 | 340 | 98.7 |

TABLE 1-continued

| Type of PVA | Polymerization conditions | | | | modifier | | | | Saponification condition | | | Results of analyses | | | |
|---|---|---|---|---|---|---|---|---|---|---|---|---|---|---|---|
| | vinyl acetate (g) | methanol (g) | amount of initially added initiator (g) | poly-merization time (h) | monomer A | initially added amount (g) *1 | concentration of consecutively added liquid (methanol liquid) (%) | consecutively added amount (g) | PVAc concentration (%) | NaOH molar ratio | average degree of polymerization (P) | viscosity | percentage content (S) *2 (mol %) | P × S | degree of saponification (mol %) |
| Synthesis Example 17 PVA 17 | 1,500 | 265 | 0.8 | 2.1 | MAmPTMS | 11.5 | 40 | 105 | 20 | 0.04 | 2,400 | | 3.0 | 7,200 | 98.4 |

*1: Monomer A was directly charged without dilution with methanol.
*2: Including the percentage content of the monomer unit having a silyl group other than the monomer unit having a group represented by the formula (1).
MAmPTMS: 3-methacrylamidopropyltrimethoxysilane
MAmOTMS: 8-methacrylamidooctyltrimethoxysilane
MAmDDTMS: 12-methacrylamidododecyltrimethoxysilane
MAmODTMS: 18-methacrylamidooctadecyltrimethoxysilane
4-PTMS: 4-pentenyltrimethoxysilane
VMS: vinyltrimethoxysilane
MAmMTMS: methacrylamidomethyltrimethoxysilane
AMPTMS: 2-acrylamido-2-methylpropyltrimethoxysilane

Example 1

Preparation of Composition and Production of Coating Film

A 4% aqueous solution of the obtained PVA 1 was prepared, and a 10% aqueous solution of titanium lactate (Ti compound: TC-310 manufactured by Matsumoto Chemical Industry Co., Ltd.) was added so that the solid content of titanium lactate with respect to a PVA solid content of 100 parts by mass was 10 parts by mass to obtain a composition according to Example 1. The composition was flow cast at 20° C. to obtain a coating film having a thickness of 40 µm.

Preparation of Composition and Production of Thermal Recording Material

To 210 g of distilled water was charged 90 g of aluminum hydroxide powder (manufactured by Showa Denko K. K.: HIGILITE H42), and the mixture was stirred manually. Thereafter, the mixture was stirred for 5 min at a rotational speed of 13,500 rpm using a homomixer (manufactured by IKA-Labortechnik, type T-25-SI) to prepare a dispersion of aluminum hydroxide (the concentration of aluminum hydroxide being 30%). Separately, PVA 1 obtained above was dissolved in water to prepare an aqueous solution of the PVA having a concentration of 10%. Next, to 57 g of the aqueous solution of the PVA thus prepared (the PVA solid content being 100 parts by mass) was added 5.7 g of a 10% aqueous solution of titanium lactate (Ti compound: manufactured by Matsumoto Chemical Industry Co., Ltd., TC-310; the solid content of titanium lactate being 10 parts by mass), and the mixture was added to 21 g of the dispersion of aluminum hydroxide (the solid content of aluminum hydroxide being 110 parts by mass). After mixing to give a homogeneous state, distilled water was added to the mixture so that the solid content concentration was 12% to obtain a coating agent (composition). Next, the coating agent was applied on the surface of a commercially available thermal paper (manufactured by KOKUYO Co., Ltd.) at 3 g/m$^2$ in terms of solid content equivalent using a wire bar coater. Thereafter, the applied face was dried at 50° C. for 10 min using a hot-air dryer to obtain a thermal recording material. The obtained thermal recording material was left to stand for 3 hours in a chamber adjusted at 20° C. and 65% RH to prepare a sample for evaluating characteristics (water resistance and blocking resistance) of the overcoat layer of the thermal recording material produced from the coating agent.

Evaluations

The coating film and the thermal recording material both obtained in Example 1 were evaluated for boiling water resistance of the coating film as well as water resistance and blocking resistance of the thermal recording material, respectively, according to the following methods. The results are shown in Table 2.

Boiling Water Resistance of Coating Film

The obtained coating film was cut into a piece having a size of a length of 10 cm and a width of 10 cm to prepare a test piece. The test piece was immersed in boiling water at 90° C. for 1 hour, and taken out (recovered). Then, moisture adhered to the surface was wiped off with gauze, and the mass of the test piece when swollen in water was determined. The test piece after the determination of the mass when swollen in water was dried at 105° C. for 16 hours, and thereafter its mass in a dry state was determined. Then, a value which was designated as a degree of swelling (fold) was obtained by dividing the mass when swollen in water by the mass in a dry state, and the evaluation was made on a 5-point scale in accordance with the following criteria. As a result, the degree of swelling of the coating film of Example 1 was 3.8 fold, leading to the evaluation of "A".

A: the degree of swelling being less than 5.0;

B: the degree of swelling being 5.0 fold or greater and less than 8.0;

C: the degree of swelling being 8.0 fold or greater and less than 10.0; and

D: the degree of swelling being 10.0 fold or greater.

Water Resistance of Thermal Recording Material

After a sample of the obtained thermal recording material was immersed in water at 30° C. for 24 hours, the overcoat layer was rubbed with a finger 100 times, and the state of peeling of the overcoat layer caused was observed and evaluated on a 5-point scale in accordance with the following criteria. As a result, the water resistance of the thermal recording material of Example 1 was evaluated as "A".

A: no peeling being observed on the surface;

B: very slight peeling being observed on the surface;

C: moderate peeling being observed on the surface; and

D: significant peeling being observed on the surface.

Blocking Resistance of Thermal Recording Material

A sample of the obtained thermal recording material was left to stand under an atmosphere of 40° C. for 72 hours, and thereafter cut into pieces having an area of 5 cm×5 cm. Next, a drop (about 30 µL) of water was dropped on the overcoat layer of the sample, thereafter another sample with no water droplet was put on the first sample such that the overcoat layers were brought into contact, and air-dried. After drying, these samples were peeled off from each other, and the mode of the peeling was observed and evaluated on a 3-point scale in accordance with the following criteria. As a result, the blocking resistance of the thermal recording material according to Example 1 was evaluated as "A".

A: the samples being readily separated without a particular application of force;

B: the surfaces of the samples being partially adhered to each other, but the samples being separated without substantial breakage; and C: the surfaces of the samples being adhered to each other, and the samples being broken upon the peeling.

Examples 2 to 26 and Comparative Examples 1 to 5

Coating films and thermal recording materials were produced in a similar manner to Example 1 except that the type and content of the PVA, the compound (B) and the polyamide polyamine epichlorohydrin-based resin (C) used were changed as shown in Table 2. The obtained coating films and thermal recording materials were evaluated for the boiling water resistance of the coating film, and the water resistance and the blocking resistance of the thermal recording material, by a method similar to that of Example 1. The results are shown in Table 2.

TABLE 2

| | PVA (A) type | Compound (B) | | Polyamide polyamine epichlorohydrin-based resin (C) | | Evaluations | | |
| | | | | | | coating film | heat-sensitive recording material | |
| | | type | content *1 (parts by mass) | type | content *1 (parts by mass) | boiling water resistance | water resistance | blocking resistance |
|---|---|---|---|---|---|---|---|---|
| Example 1 | PVA 1 | Ti compound | 10 | —*2 | —*2 | A | A | A |
| Example 2 | PVA 1 | Ti compound | 5 | —*2 | —*2 | B | A | A |
| Example 3 | PVA 2 | Ti compound | 5 | —*2 | —*2 | A | A | B |
| Example 4 | PVA 3 | Ti compound | 5 | —*2 | —*2 | A | B | B |
| Example 5 | PVA 4 | Ti compound | 5 | —*2 | —*2 | C | B | B |
| Example 6 | PVA 5 | Ti compound | 5 | —*2 | —*2 | A | A | B |
| Example 7 | PVA 6 | Ti compound | 5 | —*2 | —*2 | A | B | B |
| Example 8 | PVA 7 | Ti compound | 5 | —*2 | —*2 | C | B | B |
| Example 9 | PVA 8 | Ti compound | 5 | —*2 | —*2 | C | C | B |
| Example 10 | PVA 9 | Ti compound | 5 | —*2 | —*2 | A | A | A |
| Example 11 | PVA 10 | Ti compound | 5 | —*2 | —*2 | A | A | B |
| Example 12 | PVA 11 | Ti compound | 5 | —*2 | —*2 | A | A | B |
| Example 13 | PVA 12 | Ti compound | 5 | —*2 | —*2 | B | B | A |
| Example 14 | PVA 1 | Ti compound | 200 | —*2 | —*2 | C | B | B |
| Example 15 | PVA 1 | Ti compound | 850 | —*2 | —*2 | C | C | B |
| Example 16 | PVA 1 | Ti compound | 1 | —*2 | —*2 | C | C | B |
| Example 17 | PVA 1 | Zr compound | 5 | —*2 | —*2 | B | A | A |
| Example 18 | PVA 1 | Si compound 1 | 5 | —*2 | —*2 | B | A | A |
| Example 19 | PVA 1 | Si compound 2 | 5 | —*2 | —*2 | B | A | A |
| Example 20 | PVA 1 | Si compound 3 | 5 | —*2 | —*2 | B | A | A |
| Example 21 | PVA 1 | Ti compound | 5 | PAE | 20 | A | A | A |
| Example 22 | PVA 1 | Ti compound | 5 | PAE | 120 | C | C | B |
| Example 23 | PVA 1 | Ti compound | 5 | PAE | 0.5 | B | A | A |
| Example 24 | PVA 1 | Zr compound | 5 | PAE | 20 | A | A | A |
| Example 25 | PVA 1 | Si compound 1 | 5 | PAE | 20 | A | A | A |
| Example 26 | PVA 1 | Si compound 2 | 5 | PAE | 20 | A | A | A |
| Example 27 | PVA 1 | Si compound 3 | 5 | PAE | 20 | A | A | A |
| Comparative Example 1 | PVA 13 | —*2 | —*2 | —*2 | —*2 | —*3 | —*3 | —*3 |
| Comparative Example 2 | PVA 14 | Ti compound | 5 | —*2 | —*2 | D | D | C |
| Comparative Example 3 | PVA 15 | Ti compound | 5 | —*2 | —*2 | D | D | C |
| Comparative Example 4 | PVA 16 | Ti compound | 5 | —*2 | —*2 | D | D | C |
| Comparative Example 5 | PVA 17 | —*2 | —*2 | —*2 | —*2 | —*3 | —*3 | —*3 |

*1 Content (parts by mass) with respect to 100 parts by mass of PVA.
*2 "—" denotes no addition of the corresponding component.
*3 PVA was not completely dissolved in the aqueous solution.

As shown in Table 2, it can be seen that the coating films (compositions) obtained in Examples 1 to 27 had superior boiling water resistance (water resistance), which was evaluated as A, B or C. Furthermore, the coating films according to Examples 1 to 4, 6, 7, 10 to 13, 17 to 21 and 23 to 27 in which the viscosity average degree of polymerization (P), the degree of saponification, the percentage content (S), and the product (P×S) of the viscosity average degree of polymerization (P) and the percentage content (S) of PVA (A) as well as the ratio of PVA (A)/compound (B)/polyamide polyamine epichlorohydrin-based resin (C) blended, and the like were as specified had particularly superior boiling water resistance, which was evaluated as A or B. In addition, it can be seen that the coating films according to Examples 5, 8, 9, 14 to 16 and 22 exhibited slightly inferior boiling water resistance. This may be attributed to a low viscosity average degree of polymerization (P) and a low degree of saponification of PVA (A) and/or a decreased product (P×S) of the viscosity average degree of polymerization (P) and the percentage content (S) of PVA (A), a small or large amount of the compound (B) blended, an excessive amount of the polyamide polyamine epichlorohydrin-based resin (C) blended, and the like.

On the other hand, it can be seen that when the PVA did not satisfy the above specified requirements or the content of the compound (B) did not fall within the above specified range (i.e., Comparative Examples 1 to 5), the boiling water resistance of the resultant coating film was inferior, or the solubility in water (i.e., handleability) of the PVA itself was decreased. In addition, in comparison of Example 2 (PVA 1) with Comparative Example 2 (PVA 13) and Comparative Example 3 (PVA 14), it can be seen that although the viscosity average degree of polymerization (P) and the degree of saponification of the PVA used, the percentage content of the monomer unit having a silyl group, the amount of the compound (B) blended were substantially the same, the coating film according to Example 2 exhibited more superior boiling water resistance. Although the reasons for the effects are not fully elucidated, it is presumed that in PVA 1 used in Example 2, mobility of the silyl group is high due to n in the above formula (1) being 3 or greater, leading to superior boiling water resistance of the coating film produced therefrom.

In addition, as shown in Table 2, it can be seen that when a thermal recording material having an overcoat layer provided using the coating agent according to Examples 1 to 27 was produced, the thermal recording material exhibited favorable water resistance and blocking resistance, which were evaluated as A, B or C, and as A or B, respectively. Furthermore, the thermal recording materials according to Examples 1, 2, 10, 13, 17 to 21 and 23 to 27 in which the viscosity average degree of polymerization (P), the degree of saponification, the percentage content (S) and the product (P×S) of the viscosity average degree of polymerization (P) and the percentage content (S) of PVA (A), and the structure of the monomer unit as well as the ratio of PVA (A)/compound (B)/polyamide polyamine epichlorohydrin-based resin (C) blended, and the like were as specified had particularly superior water resistance and blocking resistance, which were evaluated as A or B, and as A, respectively. In addition, it can be seen that the thermal recording materials according to Examples 3 to 9, 11, 12, 14 to 16 and 22, for example, exhibited slightly inferior water resistance and/or blocking resistance. This may be attributed to a low viscosity average degree of polymerization (P) and a low degree of saponification of PVA (A), a small or great product (P×S) of the viscosity average degree of polymerization (P) and the percentage content (S) of PVA (A), the difference of the structure of the monomer unit, a small or large amount of the compound (B) blended, an excessive amount of the polyamide polyamine epichlorohydrin-based resin (C) blended, etc. In regard to Examples 11 and 12, it is believed that the difference of the structure of the monomer unit caused an increase in the viscosity of the coating liquid and a difficulty in the penetration of the coating liquid into the paper, and the like, leading to slightly inferior water resistance and the like, although the details are not entirely clear.

On the other hand, it can be seen that when the PVA did not satisfy the above specified requirements or the content of the compound (B) did not fall within the above specified range (i.e., Comparative Examples 1 to 5), the water resistance and the blocking resistance of the thermal recording material were deteriorated, or the solubility in water of the PVA itself was decreased. This may be attributed to: impairment of the water resistance due to the difference of the structure of the monomer unit, and/or a low product (P×S) of the viscosity average degree of polymerization (P) and the percentage content (S); a low solubility in water of PVA itself due to an increase in the product (P×S); absence of the addition of the compound (B), etc.

[Industrial Applicability]

The composition according to the embodiment of the present invention can be suitably used as, for example, coating agents for producing thermal recording materials, ink jet recording materials, base papers for a release paper, and the like.

The inventions claimed is:

1. A composition, comprising:
a vinyl alcohol polymer (A) that comprises a monomer unit having a group represented by formula (1);

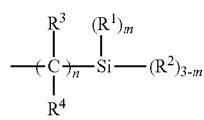
(1)

and
a compound (B) comprising at least one of a silane compound and an organic titanium compound, at a content of 0.01 parts by mass or greater and 900 parts by mass or less with respect to 100 parts by mass of the vinyl alcohol polymer (A), wherein
each $R^1$ independently represents a hydrogen atom or an alkyl group having 1 to 5 carbon atoms,
each $R^2$ independently represents an alkoxyl group, an acyloxyl group or a group represented by OM, where M represents a hydrogen atom, an alkali metal or an ammonium group,
each $R^3$ independently represents a hydrogen atom or an alkyl group,
each $R^4$ independently represents a hydrogen atom or an alkyl group,
m is an integer of 0 to 2,
n is an integer of 3 or greater,
hydrogen atoms of the alkyl group, the alkoxyl group, and the acyloxyl group are unsubstituted or substituted with a substituent having an oxygen atom or a nitrogen atom,
the vinyl alcohol polymer (A) satisfies mathematical formula (I):

$$370 \leq P \times S \leq 6{,}000 \qquad (I)$$

where P represents a viscosity average degree of polymerization, and
S represents a percentage content (mol %) of the monomer unit, and
the vinyl alcohol polymer (A) is a saponification product of a copolymer of two monomers consisting of a vinyl ester monomer and a monomer having the group represented by formula (1).

2. The composition according to claim 1, wherein the vinyl alcohol polymer (A) further satisfies mathematical formulae (II) and (III):

$$200 \leq P \leq 4{,}000 \qquad (II) \text{ and}$$

$$0.1 \leq S \leq 10 \qquad (III).$$

3. The composition according to claim 1, wherein n is an integer of 6 or greater and 20 or less.

4. The composition according to claim 1, wherein the monomer unit is represented by formula (2):

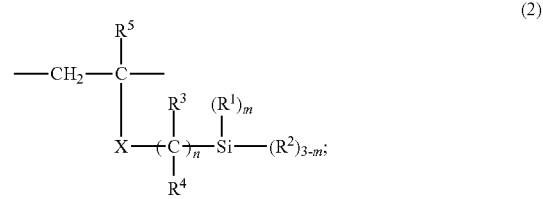
(2)

X represents a direct bond, a divalent hydrocarbon group or a divalent organic group having an oxygen atom or a nitrogen atom; and
$R^5$ is a hydrogen atom or a methyl group.

5. The composition according to claim 4,
wherein X is represented by —CO—NR$^6$13 *, wherein $R^6$ represents a hydrogen atom or an alkyl group having 1 to 5 carbon atoms, and * denotes a binding site to the group represented by formula (1).

6. The composition according to claim 4,
wherein X in is represented by —CO—NH—*, wherein * denotes a binding site to the group represented by formula (1), and
n is an integer of 3 or greater and 12 or less.

7. The composition according to claim 1, further comprising a polyamide polyamine epichlorohydrin-based resin(C).

8. The composition according to claim 4, wherein the vinyl alcohol polymer (A) is produced by saponifying a copolymer of two monomers consisting of an unsaturated monomer represented by formula (3) and a vinyl ester monomer,

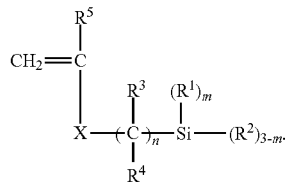

(3)

9. A coating agent, comprising the composition according to claim 1.

10. A coated article produced by applying the coating agent according to claim 9 on a surface of a substrate.

11. A method for producing a coated article, the method comprising applying the coating agent according to claim 9 to a surface of a substrate.

12. A thermal recording material,
wherein the thermal recording material is the coated article according to claim 10.

13. An ink jet recording material,
wherein the ink jet recording material is the coated article according to claim 10.

14. A base paper for a release paper,
wherein the base paper is the coated article according to claim 10.

15. A composition, comprising:
a vinyl alcohol polymer (A) that comprises a monomer unit having a group represented by formula (1);

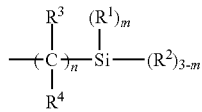

(1)

a compound (B) comprising at least one selected from the group consisting of a silane compound, an organic titanium compound, a zirconium salt, and a zirconium complex salt, at a content of 0.01 parts by mass or greater and 900 parts by mass or less with respect to 100 parts by mass of the vinyl alcohol polymer (A); and a polyamide polyamine epichlorohydrin-based resin (C),
wherein
each $R^1$ independently represents a hydrogen atom or an alkyl group having 1 to 5 carbon atoms,
each $R^2$ independently represents an alkoxyl group, an acyloxyl group or a group represented by OM, wherein M represents a hydrogen atom, an alkali metal or an ammonium group,
each $R^3$ independently represents a hydrogen atom or an alkyl group,
each $R^4$ independently represents a hydrogen atom or an alkyl group,
m is an integer of 0 to 2,
n is an integer of 3 or greater,
hydrogen atoms of the alkyl group, the alkoxyl group, and the acyloxyl group are unsubstituted or substituted with a substituent having an oxygen atom or a nitrogen atom, and
the vinyl alcohol polymer (A) satisfies mathematical formula (I):

$$370 \leq P \times S \leq 6{,}000 \tag{I}$$

where P represents a viscosity average degree of polymerization, and
S represents a percentage content (mol %) of the monomer unit.

* * * * *